United States Patent Office 3,250,146
Patented May 10, 1966

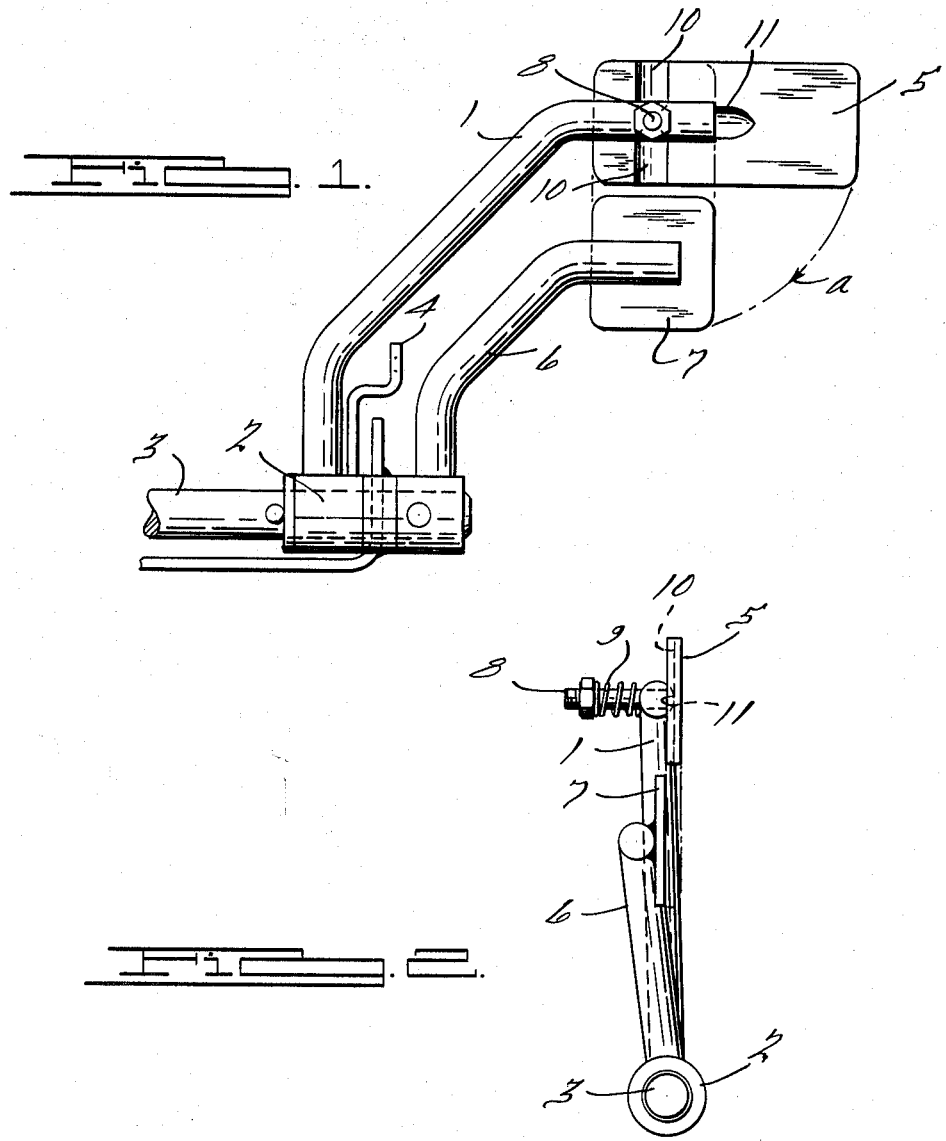

3,250,146
DUAL CONTROL PEDAL ARRANGEMENT
Günther Schlosser, Bubingen, Saar, Germany, assignor to Walter and Wolfgang Gutbrod, Bubingen, Saar, Germany
Filed Apr. 6, 1964, Ser. No. 357,538
Claims priority, application Germany, Apr. 5, 1963, G 37,465
5 Claims. (Cl. 74—480)

This invention relates to automotive vehicles, and more particularly to a dual control pedal arrangement in which the pedals are intended to be actuated either singly or jointly.

It is known to provide heavy duty tractors and similar utility vehicles with two independent brake systems which respectively act on the wheels on the right side and on the left side of the vehicle. Braking the wheels on one side of the vehicle facilitates tight turns on soft ground. it is known to provide separate brake pedals for operation of the two brake systems.

When a vehicle equipped with two brake systems in the described manner travels on a paved roadway, a conventional steering system is adequate. Steering by means of brakes is neither necessary nor desirable on a paved roadway. At the higher speeds normally available on a paved surface, it is also necessary that the wheels on both sides of the vehicle be braked with approximately the same force.

An object of the invention is the provision of a control pedal arrangement which permits two brake pedals to be coupled for joint operation, or to be uncoupled for steering of the vehicle by means of the brakes.

With this object and others in view, the invention in one of its aspects provides two brake pedal plates connected with a common supporting structure by means of respective pedal brackets for movement of the plates relative to the support in a common direction from brake inoperative to brake operative position when the plates are depressed by an operator's foot.

One of the pedal plates is mounted on its bracket for pivoting movement in a plane transverse of the aforementioned common direction toward and away from an engaging position in which the two pedal plates are at least partly aligned in the common direction of operating movement, whereby both pedal plates are moved toward the brake operative position when one is depressed.

Other features and many of the attendant advantages of this invention will be apparent to those skilled in the art from the following description of a preferred embodiment when taken in connection with the appended drawing in which:

FIG. 1 shows a brake pedal arrangement of the invention in front elevation; and

FIG. 2 shows the arrangement of FIG. 1 in side elevation.

Referring now to the drawing in detail, there is seen a first pedal bracket 1 fixedly fastened to a sleeve 2 which is rotatably mounted on a shaft 3. An arm 4 attached to the sleeve 2 connects the pedal bracket 1 to the piston in the master cylinder of a non-illustrated hydraulic brake system, not in itself relevant to this invention. A pedal plate 5 is mounted on the free end of the bracket 1.

A second pedal bracket 6 is fixedly mounted on the shaft 3. The shaft is journaled in elements of the fixed vehicle structure, and is connected to the piston of a second master cylinder in a conventional manner, not shown. The free end of the pedal bracket 6 carries a plate 7 which is of approximately square shape.

The plate 5 is mounted on the bracket 1 by means of a pivot pin 8 perpendicular to the elongated rectangular operating face of the plate. The pin 8 is axially slidable and rotatable in a conforming opening of the bracket 1. The plate 5 is held in abutting engagement with the bracket by a helical compression spring 9 coiled about the pin 8. Two grooves 10, 11 on the face of the pedal plate 5 opposite the operating face intersect each other at right angles in the axis of the pivot pin 8. The grooves conform to the cylindrical shape of the bracket 1 so that the bracket is held in abutting engagement with the sides of the groove 11 in the disengaged position of the pedal arrangement illustrated in FIG. 1.

The axis of the pin 8 is offset from the center of the pedal plate 5. The plate, therefore, may be swung about the pin axis as indicated by the arrow $a$ into an engaging position in which a portion of the plate 5 is superimposed on the plate 7 in the common direction of movement of pedal movement from the illustrated brake inoperative position into the braking position against the restraint of the non-illustrated return springs in the brake master cylinders. As best seen from FIG. 2, the two pedal plates 5, 7 are slightly offset in the direction of braking movement when in the brake inoperative position, thus permitting movement of the plate 5 between the illustrated disengaged position and the engaging position in which the pedal bracket 1 is held in engagement with the groove 10 by the spring 9.

In the illustrated position of FIG. 1, the pedal plate 5 projects laterally beyond the plate 7, and the latter projects downwardly from the former, thus permitting each brake system to be selectively energized by the pressure of the same foot during travel over rough terrain where the brakes are employed in part for steering. The plate 5 may be pivoted on the pin 8 by the foot of the operator into the engaging position in which the plate 5 is superimposed on the plate 7 so that foot pressure applied to the plate 5 actuates both brake systems. The two brake pedals, whether in the individually operable position or coupled for joint action, do not occupy substantially more space than a single conventional brake pedal.

The two pedal plates 5, 7 are juxtaposed with very little clearance when in the engaged position, as is evident from FIG. 2. Any soil transferred from the operator's shoes to the brake plate 7 is thereby scraped off by an edge of the pedal 5 when the pedal is pivoted into the engaging position. A build-up of soil on the pedal plate 7, which may interfere with properly balanced brake action during joint operation of the plates 5, 7, is thus impossible.

While the invention has been described with reference to a dual hydraulic brake system equipped with master cylinders, it is evident that the exact nature of the brake system is not relevant to the control pedal arrangement of the invention. The arm 4 and the shaft 3 may be connected to the brake valves of a dual air brake system or to the rheostats of a dual electrical brake system without affecting the mode of operation of the brake pedals.

It should be understood, therefore, that the foregoing disclosure relates to only a preferred embodiment of the invention, and that it is intended to cover all changes and modifications of the example of the invention chosen herein for the purpose of the disclosure which do not constitute departures from the spirit and scope of the invention set forth in the appended claims.

What is claimed is:

1. A control pedal arrangement for the braking system of a vehicle comprising a support member, a first pedal plate member adapted for movement between a first brake deenergizing position and a second brake energizing position, a first bracket member having a portion thereof supported on said support member and having a second portion supporting said first pedal plate, a second pedal plate member having a substantially flat surface adapted for movement between a first brake deenergizing position and a second brake energizing position including first and second alignment means formed within said flat surface, a second bracket member having a portion thereof supported on said support member and having a second portion supporting said second pedal plate, and pivotal connecting means for interconnecting said second bracket member second portion and said second pedal plate and permitting said second pedal plate to be pivoted between a first position removed from said first pedal plate with said second portion engaging said first alignment means to a second position substantially contiguous with said first pedal plate with said second portion engaging said second alignment means, said first and second pedal plates being operative independently of each other when said second pedal plate is in said first position and being operative simultaneously when said second pedal plate is in said second position.

2. A control pedal arrangement for the braking system of a vehicle comprising a support member, a first pedal plate member adapted for movement between a first brake deenergizing position and a second brake energizing position, a first bracket member having a portion thereof supported on said support member and having a second portion supporting said first pedal plate, a second pedal plate member having a substantially flat surface adapted for movement between a first brake deenergizing position and a second brake energizing position including first and second alignment means formed within said flat surface, a second bracket member having a portion thereof supported on said support member and having a second portion supporting said second pedal plate, and pivotal connecting means for interconnecting said second bracket member second portion and said second pedal plate and permitting said second pedal plate to be pivoted between a first position removed from said first pedal plate with said second portion engaging said first alignment means to a second position wherein one face of said second pedal plate is substantially contiguous with one face of said first pedal plate with said second portion engaging said second alignment means, said first and second pedal plates being operative independently of each other when said second pedal plate is in said first position and being operative simultaneously when said second pedal plate is in said second position.

3. A control pedal arrangement for the braking system of a vehicle comprising a support member, a first pedal plate member adapted for movement between a first brake deenergizing position and a second brake energizing position, a first bracket member having a portion thereof supported on said support member and having a second portion supporting said first pedal plate, a second pedal plate member adapted for movement between a first brake deenergizing position and a second brake energizing position, a second bracket member having a portion thereof supported on said support member and having a second portion supporting said second pedal plate, and pivotal connecting means including shaft means interconnecting said second pedal plate and said second portion of said second bracket member and forming a pivot axis perpendicular to said second pedal plate for permitting said second pedal plate to be pivoted between a first position removed from said first pedal plate to a second position wherein one face of said second pedal plate is substantially contiguous with one face of said first pedal plate, said shaft means having resilient biasing means thereon for resiliently biasing said second bracket means against said second pedal plate, said second pedal plate having first and second grooves formed therein, said first groove being formed perpendicular to said second groove in the plane of said second pedal plate, said second bracket member being received in said first groove when said second pedal plate is in said first position and being received in said second groove when said second pedal plate is in said second position, said first and second pedal plates being operative independently of each other when said second pedal plate is in said first position and being operative simultaneously when said second pedal plate is in said second position.

4. A control pedal arrangement for the braking system of a vehicle comprising a support member including a support member including first and second support means, a first brake system and a second brake system, means for permitting each brake system to be selectively energized by the pressure of an operator's foot including a first pedal plate member supported relative to said support member by said first support means and adapted for movement between a first brake deenergizing position and a second brake energizing position, a second pedal plate member supported relative to said support member by said second support means and adapted for movement between a first brake deenergizing position and a second brake energizing position, said second brake pedal plate being positioned in above and below relation with said first pedal plate member and projecting laterally beyond said first pedal plate member for permitting independent operation of each of said pedal plate members by the operator's foot, pivotal connecting means interconnecting said second pedal plate member and said second support means and forming a pivot axis for permitting said second pedal plate member to be pivoted between a first position removed from said first pedal plate to a second position into cooperating relation with said first pedal plate member when said second pedal plate member is in said second position, said first and second pedal plates being operative independently of each other when said second pedal plate is in said first position and being operative simultaneously when said second pedal plate is in said second position.

5. A control pedal arrangement for the braking system of a vehicle comprising a support member including a support member and first and second support means, a first brake system and a second brake system, means for permitting each brake system to be selectively energized by the pressure of an operator's foot including a first pedal plate member supported relative to said support member by said first support means and adapted for movement between a first brake deenergizing position and a second brake energizing position, a second pedal plate member supported relative to said support member by said second support means and adapted for movement between a first brake deenergizing position and a second brake energizing position, said second brake pedal plate being positioned in closely spaced relation with said first pedal plate member and substantially forming a single plane therewith, said second pedal plate member being formed of a pivot plate portion and a pedal plate portion contiguous therewith at one edge thereof, one of said pivot and said pedal plate portions projecting laterally beyond said first pedal plate member for permitting each brake system to be independently operated by the operator's foot, pivotal connecting means interconnecting said pivot plate and said second support means and forming a pivot axis perpendicular to said second pedal plate member for permitting said second pedal plate member to be pivoted between a first position removed from said first pedal plate to a second position into engagement with said first pedal plate member, said first and second pedal plates being operative independently of each other when said second pedal plate is in said first position and being operative simultaneously when said second pedal plate is in said second position.

References Cited by the Examiner

UNITED STATES PATENTS

| 1,448,921 | 3/1923 | Ershkowitz | 74—551.8 |
| 1,584,358 | 5/1926 | Dement | 188—16 |
| 1,629,381 | 5/1927 | Hill | 74—560 |
| 2,524,486 | 10/1950 | Snow | 74—562.5 |
| 2,949,093 | 8/1960 | Smith. | |
| 2,977,816 | 4/1961 | Rice | 74—480 X |
| 3,143,000 | 8/1964 | Wilson | 74—480 |
| 3,178,961 | 4/1965 | Fieldsend | 74—480 |

FOREIGN PATENTS

| 1,267,491 | 6/1961 | France. |
| 1,323,232 | 2/1963 | France. |
| 607,542 | 1/1935 | Germany. |
| 496,064 | 11/1938 | Great Britain. |

BROUGHTON G. DURHAM, *Primary Examiner.*

C. F. GREEN, *Assistant Examiner.*